Feb. 9, 1954     R. A. IRVINE ET AL     2,668,622
APPARATUS FOR RECONDITIONING USED OIL
Filed May 11, 1950     3 Sheets-Sheet 1

INVENTOR.
ROBERT A. IRVINE
ROMAN J. KRAMARZ
BY
ATTORNEY

Feb. 9, 1954   R. A. IRVINE ET AL   2,668,622
APPARATUS FOR RECONDITIONING USED OIL
Filed May 11, 1950   3 Sheets-Sheet 3

INVENTOR.
ROBERT A. IRVINE
ROMAN J. KRAMARZ
BY W. J. Foley

UNITED STATES PATENT OFFICE 2,668,622

APPARATUS FOR RECONDITIONING USED OIL

Robert A. Irvine and Roman J. Kramarz, Niagara Falls, N. Y., assignors to The Carborundum Company, Niagara Falls, N. Y., a corporation of Delaware Application May 11, 1950, Serial No. 161,446

21 Claims. (Cl. 210—113.5)

This invention relates to an apparatus for reconditioning used oil. More particularly it is concerned with apparatus and methods for treating used transformer insulating oils and the like for the purpose of restoring the original properties of the oil, such as the dielectric strength, interfacial tension, neutralization number, purity and viscosity, to such an extent that the oil will be suitable for further use.

Transformer insulating oils during use gradually undergo a deterioration or breakdown which adversely affects the oil in various ways so that after a period of time the oil is unfit for further use and must either be discarded or rehabilitated to restore its original properties. Inasmuch as a single transformer will often require the use of as much as two or three thousand gallons of oil it is obviously preferable to subject the oil to some treatment which will render it suitable for further use. The deterioration of the oil is believed to be brought about by a gradual breakdown or cracking of the oil, as well as possible resinifying, polymerization, or other chemical transformation of the oil, resulting in the formation of undesirable solid matter and chemicals such as acids, resins, asphaltic bodies, carbon and the like, which singly or together in one way or another form an undesirable sludge which interferes with the circulation of the oil through the transformer system. The presence of the sludge in the oil is accompanied by various undesirable changes in the oil which tend to lower the dielectric strength to a point where the oil is no longer safe for use. The deterioration of transformer insulating oil is shown also by a marked lowering of the interfacial tension of the oil, a darkening in color, an increase in the neutralization number and an increase in the viscosity.

It is an object of the present invention to provide an apparatus for reconditioning used oils to restore their original properties to the point where the oil will be suitable for further use.

It is a further object to provide an apparatus for reconditioning used oil which is not only effective for the intended purpose but is relatively simple and inexpensive in initial cost and can be readily renovated after periods of operation to maintain a high degree of effectiveness with a minimum of effort and expense.

Other objects and advantages accruing from the present invention will become apparent as the description proceeds.

We have found that transformer insulating oils, as well as other types of used oil such as used crankcase oils, and other used lubricating oils, can be largely restored to their original condition by initially forcing the oil through a rigid, porous diffusing medium to remove the coarser solid material contained in the oil and subsequently passing the oil through a mass of granulated filtering material such as diatomaceous earth to remove the finer solid matter and also such other extraneous chemicals which are contained in the oil and adversely affect the insulating properties and other desirable characteristics of the oil. It is a feature of the present apparatus that both the diffusing media and the filtering material can be facilely removed and renovated or replaced with a minimum of time and effort. The oil is usually heated to hold it at a viscosity suitable for the filtering operations. It is also preferred to pass the oil through a bed of finely divided charcoal in order to further clarify and restore the oil to its original condition. As the oil is passed through the final filtering step it is transmitted through a second rigid, porous medium which serves to free the oil from any fine particles of the filtering material.

In order that the invention may be more clearly understood, reference is made to the various figures of the drawing, which are illustrative, which depict apparatus constructed in accordance with the present invention and in which, Figure 1 is a side elevation, partially in section, with the perforated container partially broken away to show the final diffuser tube;

Figure 1:
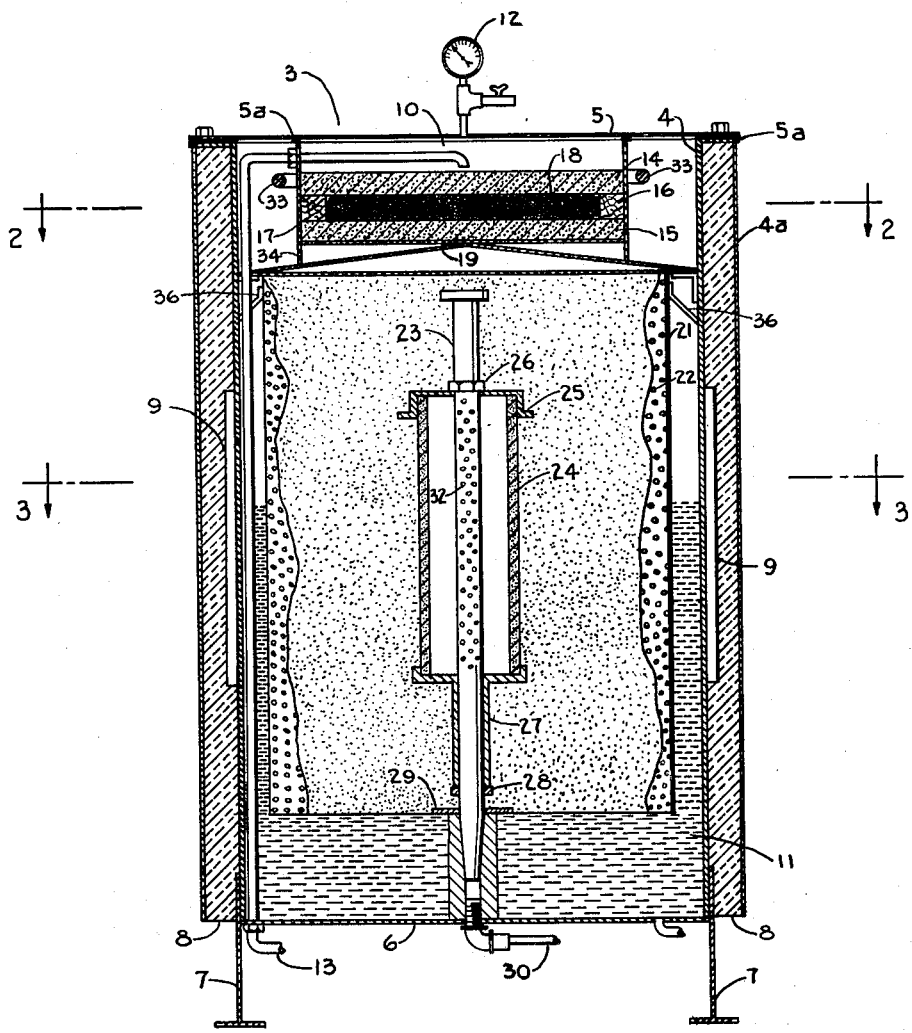
Figure 2:
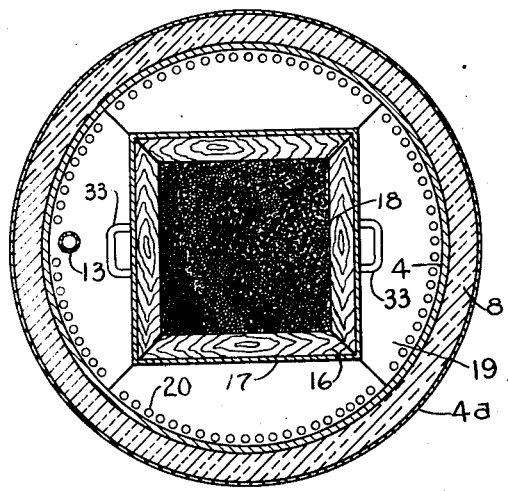
Figure 2 is a horizontal sectional view through the line 2—2 of Figure 1.
Figure 3:
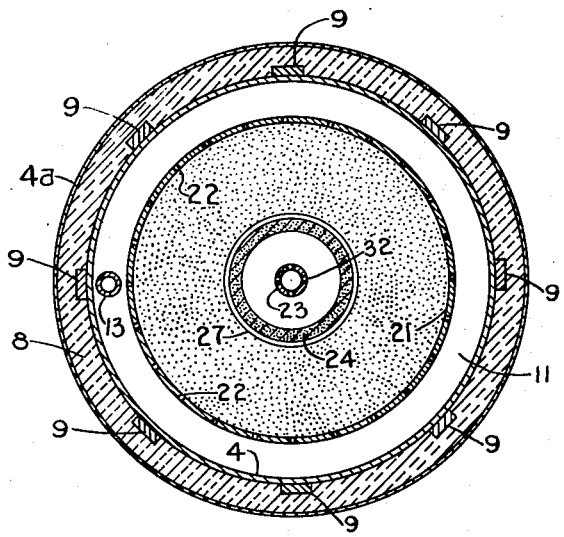
Figure 3 is a horizontal sectional view through the line 3—3 of Figure 1.

The construction and operation of the present apparatus for the reconditioning of used oil as shown in Figures 1 to 3 of the drawing can be described as follows:

The oil reconditioning means are housed in an enclosed cylindrical steel tank or chamber 3 comprising a cylindrical steel shell 4, a steel top cover plate 5 provided with a rubber gasket seal 5a and a steel bottom plate 6, the tank being mounted upon suitable supports 7. The entire apparatus is usually mounted upon a suitable wagon or other wheeled vehicle, or upon a skid or platform adapted for carriage by a lift truck, in order to facilitate its movement from one place to another.

The steel shell 4 is preferably insulated with a layer 8 of insulation 1½″ thick such as a batt of rock wool which is wrapped around the outside of the steel shell 4 and is held confined by an outer thin sheet metal casing 4a. Other insulating materials can be used in place of rock wool, such as balsa wool, asbestos, or a loose packing of any suitable insulating material. Mounted in the walls of the outer tank are eight 750 watt strip heaters 9 which are spaced equidistantly from one another about the periphery of the tank and are connected serially in pairs to a 440 volt electric power line. Although it has been found most convenient to have the heating elements mounted in the walls of the outer chamber it is also possible to use any type of immersion heater suitably positioned to heat the oil as it is subjected to being processed. The outer tank or chamber 3 is divided into an upper or secondary compartment 10 and a lower or primary compartment 11. The upper compartment 10 is provided with a conventional pressure gauge 12 to indicate the amount of pressure used to force the oil through the apparatus. Upon removal of the cover plate 5 the secondary or upper compartment 10, including the rigid, porous diffuser plate or plates referred to below can be readily removed. For that purpose the compartment 10 is provided with two handles 33 by which the compartment can be conveniently lifted out of position. An intake pipe line 13 passes vertically from the bottom of the tank up through the lower compartment 11 up to and into the upper chamber 10. The floor of chamber 10 consists of a rigid, ceramic-bonded porous diffuser plate 14, such as for example a 12″ x 12″ porous bonded silicon carbide or porous bonded fused aluminum oxide plate about 1″ in thickness. Granular fused alumina plates of suitable porosity which have been found highly satisfactory for such use are bonded fused alumina filter plates of approximately 36% porosity (which is the ratio of pore space to the total volume). Bonded silicon carbide porous plates of similar porosity can also be used. The porosity can be somewhat above or below the above-mentioned figure, if desired. Mounted directly below the porous plate 14 is a second porous plate 15 similar in character to plate 14 and separated therefrom by a wooden spacer frame 16 which fits snugly against the metal side walls 17 of the upper compartment 10. The space defined by the porous plates 14 and 15 and the spacer frame 16 is filled with a bed of finely divided charcoal 18. The secondary compartment 10 and the rigid, porous plates 14 and 15 fitted therein are supported by an inclined supporting plate 19 and held level and prevented from tilting by extended legs 34. The charcoal bed 18 and the upper and lower porous confining plates 14 and 15, together with the inclined supporting plate or structure 19 serve as a communicating passage between the upper compartment 10 and the lower compartment 11. The supporting plate or structure 19 is of shallow pyramidal form with the four edges defining the four sides of the pyramid so that the plate as a whole is inclined or pitched to the outer rim of the plate to direct the oil coming through plate 15 to the outer zone of compartment 11 surrounding the cylinder 21. The oil passes through suitable perforations or openings 20 provided in the outer portion of plate 19. Plate 19 rests upon shoulder brackets 36 which also serve to keep the container 21 equally spaced from the side walls of the outer or primary chamber.

The perforated steel cylinder or container 21, the entire cylindrical walls of which are perforated with ⅛″ openings or perforations 22, is mounted concentrically with the outer cylindrical tank 3 in axial alignment therewith and suitably spaced from the outer walls. For example, in an outer cylindrical chamber having an inside wall to wall diameter of 16″, the perforated inner cylinder 21 is spaced about 1″ from the wall of the outer chamber. Mounted within the cylinder 21 is a concentrically located pipe 23 upon which is mounted a rigid, porous ceramic-bonded diffuser tube 24 which is positioned approximately midway vertically of the pipe 23 and held in position thereon by means of a cap plate 25 fastened by means of lock nut 26, and lower cap plate 27. A diffuser tube 18″ in length and 3″ in diameter having a ½″ wall thickness and composed of either bonded coarse grit silicon carbide or fused aluminum oxide has been found satisfactory. One such tube of the described type which is available on the market and which has been found highly satisfactory for the purpose is a silicon carbide diffuser tube having a porosity of approximately 36%. The pipe 23 is secured at the bottom of the perforated shell 21 by means of a lock nut 28 and washer 29; the pipe communicates with outlet 30 in the bottom of the outer chamber. The space between the porous tube 24 and the perforated cylinder 21 is filled with a granular filler material such as 60-100 grit size diatomaceous earth, otherwise commonly referred to as fuller's earth. Although the fuller's earth may be placed in the cylinder 21 in loose condition it has been most effectively used and can be most readily removed and replaced by fresh material when it is contained in a bag of such size as to substantially fill the cylindrical shell 21. A cylindrical shell 21 of the described type 40″ in height and 14″ in diameter is just large enough to conveniently hold a bag containing 50 pounds of 60-100 grit size diatomaceous earth in the center of which is mounted a diffuser tube of the described size and type. When the diatomaceous earth is used in bag form a hole is punched in the bottom of the bag and the lower end of pipe 23 which is provided with a tapered portion is inserted through the hole in the bag. The portion of the pipe 23 which is confined within the length of the porous tube 24 is provided with a plurality of small discharge openings 32.

Figure 5:
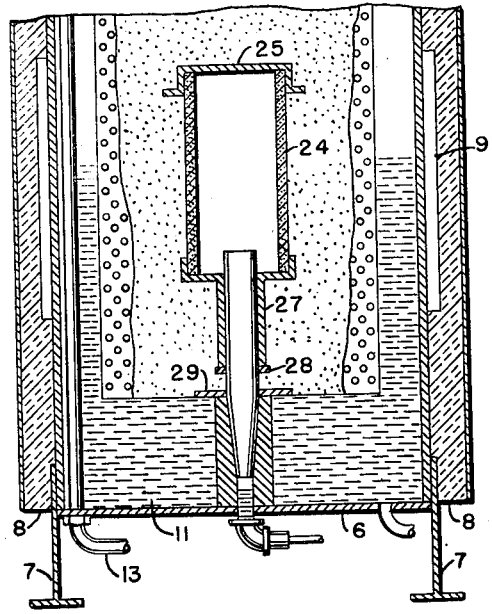

Instead of using a pipe 23 extending throughout the length of the diffuser tube and provided with discharge openings in that portion within the diffuser tube as shown in Figure 1, the pipe 23 can be shorter in length so as to extend just above the bottom of the diffuser tube with the top of the pipe open to receive the oil, as is shown in Figure 5, in which case the cap 25 seals off the top of the diffuser tube without provision for holding the pipe.

Figure 4:
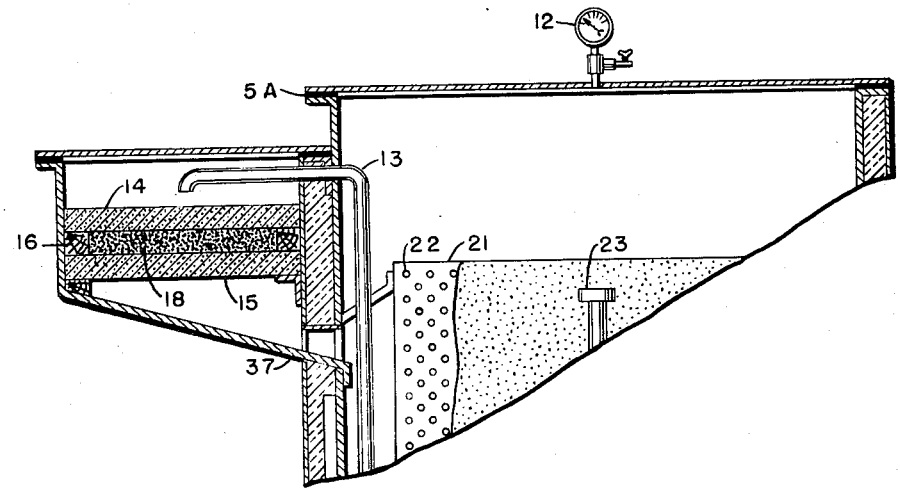
Figures 4 and 5 are fragmentary views similar to that of Figure 1 and show a modified form of oil treating apparatus made in accordance with the present invention, the view being restricted to that part of the apparatus differing from the apparatus shown in Figure 1.

Figure 4, in which like parts are identified by the same reference numerals, depicts a modified form of oil treating apparatus constructed in accordance with the present invention and in which the smaller secondary chamber 10, instead of being removably mounted within the upper portion of the main or primary chamber, is detachably secured to the outer side wall of the primary chamber. This modified structure has, in addition to substantially all the advantages of the apparatus shown in Figures 1 to 3, the added advantage of making it possible to remove and replace or restore the porous diffuser tube 24 and/or the filtering material surrounding it without in any way disturbing the secondary chamber. Also, it is obvious that with the modification shown in Figure 4 the smaller secondary receiving chamber 10 and the porous plates mounted therein can be separately removed and renovated without in any way disturbing or disrupting the primary filtering material and associated structure. In operating the apparatus shown in Figure 4 the oil to be reconditioned is brought up through the main chamber 11 and introduced onto the rigid, porous plate 14 by means of inlet pipe 13. The oil is forced down through the bed of charcoal 18 and the lower porous plate 15 in a manner similar to that for the apparatus of Figures 1 to 3, the oil being deposited upon the inclined base plates 37 of the secondary chamber. This inclined base plate is so constructed as to communicate with and convey the oil from the secondary chamber 10 into the main chamber 11 where it is further filtered and treated in accordance with the description given above in connection with the apparatus of Figures 1 to 3.

Figure 6:
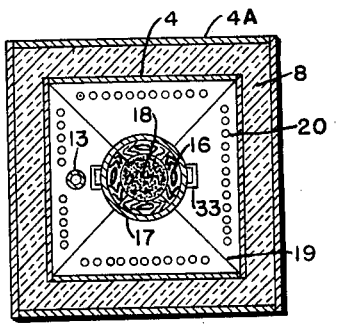
Figure 6 is a horizontal sectional view similar to that of Figure 3 and shows a modified form of oil treating apparatus made in accordance with the present invention.

Other modifications in the structural details of the various parts and their arrangement in the described apparatus are possible without departing from the spirit and scope of the present invention. For example, the diffuser plates 14 and 15 may be of other shapes, such as circular plates, as is shown in Figure 6, cone or dish shaped or of other convenient outline, although the form shown is considered to be the simplest and least expensive. Also, the container 21, instead of being cylindrical, may be square or box-shaped, as is shown in Figure 6, or of other contour, although the described form is to be preferred.

Reconditioning of used oil by means of the above described apparatus is carried out as follows. The used oil is brought into the apparatus through pipe 13 and by reason of being conducted through the entire length of the lower chamber 11 is subjected to an initial heating and is finally discharged into chamber 10. The temperature of the oil as it comes from the transformer is customarily around 70° F.; circulation of the oil through the present apparatus raises the temperature to around 125° to 130° F. The oil is forced in by means of any conventional force pump (not shown in the drawing) under around 15-20 pounds' pressure and is forced down through the primary diffusing and filtering means consisting of porous plate 14 and porous plate 15. The upper plate serves to extract coarse solid matter and the heavier sludging constituents from the oil which then passes through the bed of charcoal 18 which can be omitted but is desirable for best results since it serves to further clarify the oil and restore it to its original luster and appearance. As the oil passes from the lower porous plate 15 it passes through the openings provided in the supporting structure 19 into lower chamber 11. As the lower chamber 11 is filled with the initially filtered oil the oil passes through the perforations in the cylindrical shell 21 through the mass of diatomaceous earth contained within the shell. The diatomaceous earth removes the remaining solid matter and other extraneous undesirable constituents contained in the used oil and which together have rendered it unfit for use. The oil then passes through the walls of the porous tube 24 and from the interior of the tube is discharged through openings 32 in the pipe 23 through which the oil passes to the outlet 30 where it is collected ready for further use.

Where reference herein and in the claims is made to a ceramic-bonded porous plate or diffuser plate or to ceramic-bonded porous tube or diffuser tube it is intended to cover a porous tube composed of granular silicon carbide, granular fused alumina or other suitable inorganic granular material such as mullite or sillimanite grain, or other granular material which has been bonded together to form a porous body of the described type. Usually the granular material of such bodies is held together by a small amount of clay or other ceramic bonding material.

An apparatus of the type and size described above has been found capable of reconditioning oil at the rate of around 125 gallons per hour. The apparatus is of such size as to render it extremely convenient to transport from one location to another and can be used to recondition used transformer oil without removing the transformer from use by hooking up the intake pipe and outlet pipe with the oil chambers of the transformer and circulating the oil through the apparatus until appropriate tests show that the oil has been restored sufficiently to its original condition. It is also pointed out that the described equipment can be used in conjunction with conventional blotter presses of the type commonly used for extracting moisture from used oil in which case as the oil is discharged at the outlet 30 of the apparatus it is transmitted to the blotter press and processed in the usual manner.

The extent to which new oil undergoes deterioration in respect of various of its important properties in the course of its use as an insulating oil in transformers, and also the effectiveness with which the present process and apparatus restores those properties to their original values, can best be shown by the following table which sets forth various physical characteristics of a typical transformer insulating oil in its original condition and also the properties of the used oil before and after purification treatment in the apparatus herein described.

| Property | New Oil | Used Oil | |
|---|---|---|---|
| | | Before | After |
| Viscosity (Saybolt Universal at 130° F.) | 50 seconds | 70 seconds | 50 seconds. |
| Neutralization Number (in mg. KOH/gm.) | .01 | .64 | .03. |
| Color | golden luster | dark reddish color. No luster. | golden luster. |
| Dielectric Strength (Kilovolts) | 24 | 19.6–23.6 | 25. |
| Interfacial Tension (dynes/cm.) | 38.40 | 13.4 | 40.9. |

Having described the invention it is desired to claim:

1. An apparatus for reconditioning used oil comprising an outer enclosed chamber divided into upper and lower compartments, means for introducing oil under pressure into the upper compartment of said chamber, diffuser means communicating between the upper and lower compartments for diffusing said oil and extracting coarse solid bodies therefrom as the oil is forced from the upper compartment to the lower compartment, heating means for heating the oil in said lower compartment, a perforated container mounted in said lower compartment and spaced from the walls thereof and adapted to contain a mass of granular filtering material, a porous, ceramic-bonded diffuser tube mounted within said perforated container and disposed equidistantly from the perforated side walls thereof, and a discharge pipe connected to said porous tube and communicating with the interior thereof for removing the reconditioned oil and conveying it to a discharge outlet.

2. An apparatus according to claim 1 in which the diffuser tube is bonded silicon carbide.

3. An apparatus according to claim 1 in which the diffuser tube is bonded fused alumina.

4. An apparatus for reconditioning used oil comprising an outer chamber enclosed from the atmosphere, an inner chamber in the upper portion of said outer chamber for receiving the oil to be reconditioned, means for introducing the oil to be reconditioned into said inner chamber, porous plate means communicating with said receiving chamber for diffusing the oil as it leaves said chamber and extracting coarse solid bodies therefrom, heating means for heating the oil, a centrally disposed perforated container supported in the lower portion of the outer chamber spaced from the side walls thereof and adapted to contain a mass of granular filtering material, a vertically disposed porous tube mounted in said perforated container and capped at the top and bottom, and a discharge pipe communicating with the interior of said porous tube for removing the reconditioned oil therefrom.

5. An apparatus for reconditioning used oil comprising an outer enclosed chamber divided into upper and lower compartments, means for introducing oil under pressure into the upper compartment of said chamber, diffuser means communicating between the upper and lower compartments for diffusing said oil and extracting coarse solid bodies therefrom as the oil is forced from the upper compartment to the lower compartment, heating means for heating the oil in said lower compartment, a perforated container mounted in said lower compartment and spaced from the walls thereof and adapted to contain a mass of granular filtering material, a porous bonded tube mounted within said perforated container and disposed equidistantly from the perforated side walls thereof, a mass of granular filtering material within the space between the said porous tube and the walls of the perforated container, and a discharge pipe communicating with the interior of said porous tube for removing the reconditioned oil and conveying it to a discharge outlet.

6. An apparatus for reconditioning used oil comprising an outer enclosed chamber divided into upper and lower compartments, means for introducing oil under pressure into the upper compartment of said chamber, diffuser means communicating between the upper and lower compartments for diffusing said oil and extracting coarse solid bodies therefrom as the oil is forced from the upper compartment to the lower compartment, heating means for heating the oil in said lower compartment, a perforated container mounted in said lower compartment and spaced from the walls thereof and adapted to contain a bag of granular filtering material, a bag of granular filtering material within said perforated container, a porous bonded tube mounted within said perforated container and bag and surrounded by the granular contents of said bag, and a discharge pipe connected to the base of said porous tube and extending through the bottom of said bag and perforated container for removing the reconditioned oil and conveying it to a discharge outlet.

7. An apparatus for reconditioning used oil comprising an outer enclosed chamber divided into upper and lower compartments, means for introducing oil under pressure into the upper compartment of said chamber, diffuser means communicating between the upper and lower compartments for diffusing said oil and extracting coarse solid bodies therefrom as the oil is forced from the upper compartment to the lower compartment, heating means for heating the oil in said lower compartment, a cylinder with perforated side walls mounted in said lower compartment and spaced from the walls thereof and adapted to contain a mass of granular filtering material, a porous bonded tube mounted within said perforated cylinder and disposed equidistantly from the perforated side walls thereof, and a discharge pipe communicating with the interior of said porous tube for removing the reconditioned oil and conveying it to a discharge outlet.

8. An apparatus for reconditioning used oil comprising an outer enclosed chamber divided into upper and lower compartments, means for introducing oil under pressure into the upper compartment of said chamber, diffuser means communicating between the upper and lower compartments for diffusing said oil and extracting coarse solid bodies therefrom as the oil is forced from the upper compartment to the lower compartment, heating means for heating the oil in said lower compartment, a perforated cylinder mounted in said lower compartment and spaced from the walls thereof and adapted to contain a bag of granular filtering material, a bag of granular filtering material within said perforated cylinder, a porous bonded tube mounted within said perforated cylinder and bag and surrounded by the granular contents of said bag, said tube being in axial alignment with said perforated cylinder, and a discharge pipe extending through said perforated cylinder and porous tube and in axial alignment therewith, the portion of said pipe within said porous tube being provided with a plurality of discharge openings for receiving the reconditioned oil.

9. An apparatus for reconditioning used oil comprising an outer enclosed chamber divided into upper and lower compartments, means for introducing oil under pressure into the upper compartment of said chamber, a diffuser means communicating between the upper and lower compartments for diffusing said oil and extracting coarse solid bodies therefrom as the oil is forced from the upper compartment to the lower compartment, said diffuser means comprising a rigid, porous, ceramic-bonded plate, heating means for heating the oil in said lower compartment, a perforated container mounted in said lower compartment and spaced from the walls thereof and adapted to contain a mass of granular filtering material, a porous bonded tube mounted within said perforated container and disposed equidistantly from the perforated side walls thereof, and a discharge pipe communicating with the interior of said porous tube for removing the reconditioned oil and conveying it to a discharge outlet.

10. An apparatus according to claim 9 in which the ceramic-bonded plate of the diffuser means is bonded silicon carbide.

11. An apparatus according to claim 9 in which the ceramic-bonded plate of the diffuser means is bonded fused alumina.

12. An apparatus for reconditioning used oil comprising an outer enclosed chamber divided into upper and lower compartments, means for introducing oil under pressure into the upper compartment of said chamber, a diffuser means communicating between the upper and lower compartments for diffusing said oil and extracting coarse solid bodies therefrom as the oil is forced from the upper compartment to the lower compartment, said diffuser means comprising a pair of superimposed, rigid, porous ceramic-bonded plates separated by a mass of finely divided charcoal, heating means for heating the oil in said lower compartment, a perforated container mounted in said lower compartment and spaced from the walls thereof and adapted to contain a mass of granular filtering material, a porous ceramic-bonded diffuser tube mounted within said perforated container and disposed equidistantly from the perforated side walls thereof, and a discharge pipe communicating with the interior of said porous tube for removing the reconditioned oil and conveying it to a discharge outlet.

13. An apparatus according to claim 12 in which the ceramic-bonded plates of the diffuser means and the diffuser tube are of bonded silicon carbide.

14. An apparatus according to claim 12 in which the ceramic-bonded plates of the diffuser means and the diffuser tube are of bonded fused alumina.

15. An apparatus for reconditioning used oil comprising an outer enclosed chamber provided with insulated side walls having heating means mounted therein, said chamber being divided into upper and lower compartments, means for introducing oil under pressure into the upper compartment of said chamber, diffuser means communicating between the upper and lower compartments for diffusing said oil and extracting coarse solid bodies therefrom as the oil is forced from the upper compartment to the lower compartment, a perforated container mounted in said lower compartment and spaced from the walls thereof and adapted to contain a mass of granular filtering material, a porous bonded tube mounted within said perforated container and disposed equidistantly from the perforated side walls thereof, and a discharge pipe connected to the base of said porous tube for removing the reconditioned oil and conveying it to a discharge outlet.

16. An apparatus for reconditioning used oil comprising an outer chamber enclosed from the atmosphere, a removable inner chamber in the upper portion of said outer chamber for receiving the oil to be reconditioned, means for introducing the oil to be reconditioned into said inner chamber, porous plate means removable with said receiving chamber and communicating therewith for diffusing the oil as it leaves said chamber and extracting coarse solid bodies therefrom, heating means for heating the oil, a centrally disposed perforated container supported in the lower portion of the outer chamber spaced from the side walls thereof and adapted to contain a mass of granular filtering material, a vertically disposed porous tube mounted in said perforated container and capped at the top and bottom, and a discharge pipe communicating with the interior of said porous tube for removing the reconditioned oil therefrom.

17. An apparatus for reconditioning used oil comprising a primary chamber enclosed from the atmosphere, a detachable secondary chamber communicating with the upper portion of said primary chamber for receiving the oil to be reconditioned, means for introducing the oil to be reconditioned into said secondary chamber, porous plate means removable with said detachable secondary chamber and communicating between said primary and secondary chambers for diffusing the oil as it leaves said primary chamber and extracting coarse solid bodies therefrom, heating means for heating the oil, a centrally disposed perforated container supported in the lower portion of the primary chamber spaced from the side walls thereof and adapted to contain a mass of granular filtering material, a vertically disposed porous tube mounted in said perforated container and capped at the top and bottom, and a discharge pipe communicating with the interior of said porous tube for removing the reconditioned oil therefrom.

18. An apparatus for reconditioning used oil comprising a primary chamber enclosed from the atmosphere, a secondary chamber detachably mounted exteriorly on the side of the primary chamber and communicating with the upper portion of the interior thereof, said secondary chamber serving to receive the oil to be reconditioned, means for introducing the oil to be reconditioned into said secondary chamber, porous plate means mounted within said secondary chamber and communicating between the primary and secondary chambers for diffusing the oil as it leaves said secondary chamber and extracting coarse solid bodies therefrom, heating means for heating the oil, a centrally disposed perforated container supported in the lower portion of the primary chamber spaced from the side walls thereof and adapted to contain a mass of granular filtering material, a vertically disposed porous tube mounted in said perforated container and capped at the top and bottom, and a discharge pipe communicating with the interior of said porous tube for removing the reconditioned oil therefrom.

19. An apparatus according to claim 18 in which the porous plate means and the diffuser tube are of bonded silicon carbide.

20. An apparatus according to claim 18 in which the porous plate means and the diffuser tube are of bonded fused alumina.

21. An apparatus for reconditioning used oil comprising an outer enclosed chamber divided into secondary and primary compartments, means for introducing oil under pressure into the secondary compartment of said chamber, diffuser means communicating between the secondary and primary compartments for diffusing said oil and extracting coarse solid bodies therefrom as the oil is forced from the secondary compartment to the primary compartment, heating means for heating the oil in said primary compartment, a perforated container mounted in said primary compartment and spaced from the walls thereof and adapted to contain a mass of granular filtering material, a porous, ceramic-bonded diffuser tube mounted within said perforated container and disposed equidistantly from the perforated side walls thereof; and a discharge pipe connected to said porous tube and communicating with the interior thereof for removing the reconditioned oil and conveying it to a discharge outlet.

ROBERT A. IRVINE.
ROMAN J. KRAMARZ.

References Cited in the file of this patent

UNITED STATES PATENTS

| Number | Name | Date |
|---|---|---|
| 522,819 | Ball et al. | July 10, 1894 |
| 528,630 | Freise | Nov. 6, 1894 |
| 677,893 | Maignen | July 9, 1901 |
| 1,103,499 | Friese | July 14, 1914 |
| 1,750,073 | Walsh | Mar. 11, 1930 |
| 1,769,388 | Prentice | July 1, 1930 |
| 2,103,434 | Pennebaker | Dec. 28, 1937 |
| 2,249,681 | Briggs | July 15, 1941 |
| 2,278,488 | Ralston | Apr. 7, 1942 |
| 2,302,240 | Michaud | Nov. 17, 1942 |
| 2,304,453 | Gudmundson | Dec. 8, 1942 |
| 2,434,958 | Quinn | Jan. 27, 1948 |
| 2,436,077 | Robertson | Feb. 17, 1948 |

FOREIGN PATENTS

| Number | Country | Date |
|---|---|---|
| 23,001 | Great Britain | 1908 |